US011902772B1

(12) United States Patent
Meade et al.

(10) Patent No.: US 11,902,772 B1
(45) Date of Patent: *Feb. 13, 2024

(54) OWN VOICE REINFORCEMENT USING EXTRA-AURAL SPEAKERS

(71) Applicant: Apple Inc., Cupertino, CA (US)

(72) Inventors: Paul Meade, San Mateo, CA (US); Christopher T. Eubank, Mountain View, CA (US); Neal D. Evans, Sunnyvale, CA (US); Nikolas T. Vitt, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,584

(22) Filed: Nov. 21, 2022

Related U.S. Application Data

(63) Continuation of application No. 16/897,188, filed on Jun. 9, 2020, now Pat. No. 11,523,244.

(60) Provisional application No. 62/865,102, filed on Jun. 21, 2019.

(51) Int. Cl.

| | |
|---|---|
| ***H04S 7/00*** | (2006.01) |
| ***H04R 5/027*** | (2006.01) |
| ***H04R 5/033*** | (2006.01) |
| ***H04R 1/40*** | (2006.01) |
| ***H04R 3/00*** | (2006.01) |
| ***G10K 11/178*** | (2006.01) |

(Continued)

(52) U.S. Cl.
CPC ........ *H04S 7/304* (2013.01); *G10K 11/17873* (2018.01); *G10K 15/08* (2013.01); *H04R 1/406* (2013.01); *H04R 3/005* (2013.01); *H04R 5/027* (2013.01); *H04R 5/033* (2013.01); *H04R 5/04* (2013.01); *H04S 7/306* (2013.01); *G10K 2210/1081* (2013.01); *G10K 2210/3044* (2013.01); *H04R 2420/07* (2013.01); *H04R 2499/15* (2013.01); *H04S 2400/15* (2013.01)

(58) Field of Classification Search
CPC ............. G10K 11/17873; G10K 15/08; G10K 2210/1081; G10K 2210/3044; H04R 1/406; H04R 3/005; H04R 5/027; H04R 5/033; H04R 5/04; H04R 2420/07; H04R 2499/15; H04S 7/306; H04S 2400/15
USPC ......... 381/56, 58, 71.1, 71.2, 104, 124, 303, 381/311
See application file for complete search history.

(56) References Cited

U.S. PATENT DOCUMENTS

| | | | |
|---|---|---|---|
| 10,332,538 | B1 | 6/2019 | Dusan |
| 10,972,844 | B1 | 4/2021 | Chiang |
| 2007/0009122 | A1 | 1/2007 | Hamacher |

(Continued)

*Primary Examiner* — William A Jerez Lora
(74) *Attorney, Agent, or Firm* — Aikin & Gallant, LLP

(57) ABSTRACT

A system including an audio source device having a first microphone and a first speaker for directing sound into an environment in which the audio source device is located and a wireless audio receiver device having a second microphone and a second speaker for directing sound into a user's ear. The audio source device is configured to 1) capture, using the firs microphone, speech of the user as a first audio signal, 2) reduce noise in the first audio signal to produce a speech signal, and 3) drive the first speaker with the speech signal. The wireless audio receiver device is configured to 1) capture, using the second microphone, a reproduction of the speech produced by the first speaker as a second audio signal and 2) drive the second speaker with the second audio signal to output the reproduction of the speech.

20 Claims, 8 Drawing Sheets

(51) Int. Cl.
*H04R 5/04* (2006.01)
*G10K 15/08* (2006.01)

(56) References Cited

U.S. PATENT DOCUMENTS

| | | | | |
|---|---|---|---|---|
| 2012/0008807 | A1 | 1/2012 | Gran | |
| 2017/0109131 | A1* | 4/2017 | Boesen | G06F 3/011 |
| 2017/0352360 | A1 | 12/2017 | Thoen | |
| 2017/0359467 | A1 | 12/2017 | Norris | |
| 2018/0011682 | A1* | 1/2018 | Milevski | A63F 13/47 |
| 2018/0014140 | A1* | 1/2018 | Milevski | H04S 7/304 |
| 2018/0124497 | A1* | 5/2018 | Boesen | H04W 4/38 |
| 2018/0146307 | A1 | 5/2018 | Petersen | |
| 2019/0019495 | A1 | 1/2019 | Asada | |
| 2020/0294313 | A1* | 9/2020 | Arroyo Palacios | A63F 13/25 |

* cited by examiner

Stage
1

Stage
2

OWN VOICE REINFORCEMENT USING EXTRA-AURAL SPEAKERS

CROSS-REFERENCE TO RELATED APPLICATION

This application is a continuation of co-pending U.S. application Ser. No. 16/897,188, filed Jun. 9, 2020, which claims the benefit of and priority to U.S. Provisional Patent Application Ser. No. 62/865,102, filed Jun. 21, 2019, which is hereby incorporated by this reference in its entirety.

FIELD

An aspect of the disclosure relates to a computer system that produces virtual air conduction paths in order to reinforce a user's own speech, when the user speaks in a virtual environment.

BACKGROUND

Headphones are an audio device that include a pair of speakers, each of which is placed on top of a user's ear when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, that drives each of the speakers of the devices with an audio signal in order to produce sound (e.g., music). Headphones and earphones provide a convenient method by which the user can individually listen to audio content, without having to broadcast the audio content to others who are nearby.

SUMMARY

An aspect of the disclosure is a system that reinforces a user's own speech, while the user speaks in a computer-generated reality (e.g., virtual reality) environment. For instance, when a person speaks in a physical environment, the person perceives own voice through at least two air conduction paths, a direct path from the user's mouth to the user's ear(s) and an indirect reverberation path made up of many individual reflections. The present disclosure provides a system of virtualizing these paths in order to allow a user who speaks in a virtual environment to perceive a virtual representation of these paths. The system includes an audio source device (e.g., a head-mounted device (HMD)) and a wireless audio receiver device (e.g., an "against the ear" headphone, such as an in-ear, on-ear, and/or over-the-ear headphone). The HMD captures, using a microphone, speech of a user of the HMD (and of the headphone) as a first audio signal. The HMD reduces noise in the first audio signal to produce a speech signal and uses the speech signal to drive a first speaker of the HMD. The headphone captures, using a microphone, the reproduction of the speech produced by the first speaker of the HMD as a second audio signal and uses the second audio signal to drive a second speaker of the headphone to output the reproduction of the speech.

In one aspect, the previously-mentioned operations performed by the HMD and the headphones may be performed while both devices operate together in a first mode. This first mode may be a virtual reality (VR) session mode in which a display screen of the HMD is configured to display a VR setting. While in this VR session mode, the HMD is configured to obtain an input audio signal containing audio content, spatially render the input audio signal into a spatially rendered input audio signal, and wirelessly transmit, over a computer network, the spatially rendered input audio signal to the headphones for output through the second speaker. In one aspect, the audio content may be associated with a virtual object contained within the VR setting.

In one aspect, the HMD is configured to determine an amount of virtual reverberation caused by a virtual environment (e.g., a virtual room) in the VR setting based on the speech of the user and the room acoustics of the virtual room and add the amount of reverberation to the input audio signal.

In one aspect, while in the VR session mode, the headphones are configured to activate an active noise cancellation (ANC) function to cause the second speaker to produce anti-noise.

In one aspect, the HMD and the headphones may operate together in a second mode that may be a mixed reality (MR) session mode in which the display screen of the HMD is configured to display a MR setting. While in the MR session mode, the HMD is configured to cease driving the first speaker with the speech signal and the headphones are configured to capture, using the second microphone, speech of the user as a third audio signal, activate an acoustic transparency function to render the third audio signal to cause the second speaker to reproduce at least a portion of the speech, and disable the ANC function.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
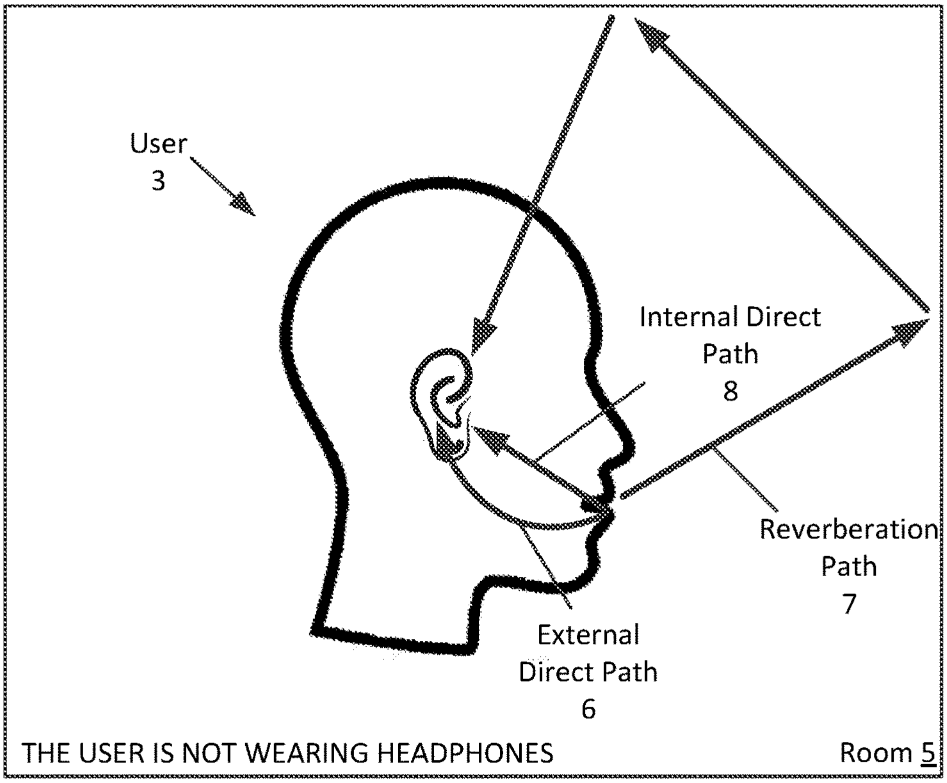
FIG. 1 shows the effects of air conduction and bone conduction paths between a user's mouth and the user's ear, while the user is wearing over-the-ear headphones.
Figure 1:
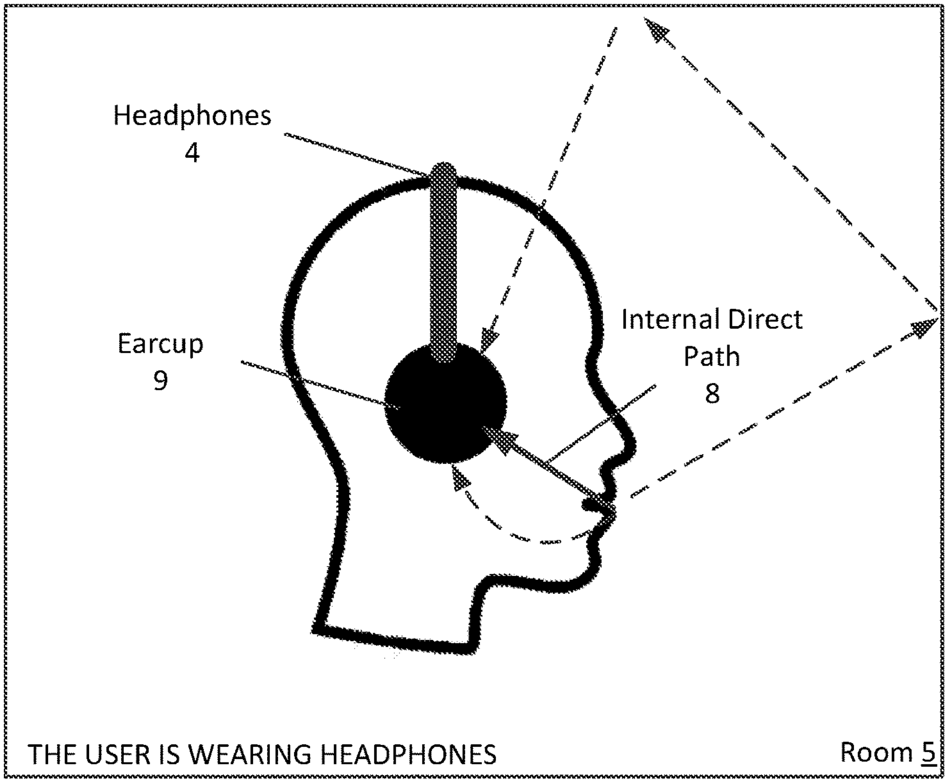

Several aspects of the disclosure with reference to the appended drawings are now explained. Whenever the shapes, relative positions, and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description. In one aspect, ranges disclosed herein may include any value (or quantity) between end point values and/or the end point values. A physical environment (or setting) refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example; computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems (or head mounted devices (HMDs)), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 shows the effects of air conduction and bone conduction paths between a user's mouth (and/or vocal cords) and the user's right ear, while the user is wearing headphones. Specifically, this figure includes two stages 1 and 2 that show the effects on a user's perceived own voice while in a room 5, when the user 3 is wearing over-the-ear headphones 4 that cover (at least a portion of) the user's ears.

Stage 1 illustrates user 3 speaking and as a result perceiving the user's own voice through different conduction paths that make up different (e.g., three) components of the user's own voice. As illustrated, since the user is not wearing headphones, when the user 3 speaks there are two air conduction paths that travel from the user's mouth to the user's ear. Specifically, there is an external direct path 6 and an indirect reverberation path 7. The external direct path 6 is a path along which the user's voice travels from the user's mouth, through the physical environment (e.g., the room 5), and directly towards the user's ear. Here, the external direct path 6 traverses along the outside of the user's cheek. In other words, the external direct path 6 may correspond to the direct sound (and/or early reflections) of a measured impulse response at the user's ear. The reverberation path 7 is an indirect air conduction path that enters into the room 5, reflects off one or more objects (e.g., a wall, a ceiling, etc.), and returns to the user's ear as one or more reflections at a later time than the external direct path 6. The third component is an internal direct path 8, which is a bone conduction path, in which the vibrations of the user's voice travels (e.g., from the user's vocal cords and) through the user's body (e.g., skull) towards the user's inner ear (e.g., cochlea).

The combination of the three components provides a user with a known perception of own voice. To speak naturally in an environment, a person uses these components to self-monitor vocal output. If one of these components is distorted or interrupted in any way, a user may consciously (or unconsciously) try to compensate. Stage 2 illustrates the user 3 wearing headphones 4 that have (at least) an earcup 9 that at least partially covers the user's right ear. As a result, the earcup 9 is passively attenuating the air conduction paths, while the user speaks, as illustrated by the external direct path 6 and reverberation path 7 changing from a solid line to a dashed line. This passive attenuation may cause the user 3 to adjust vocal output in order to compensate for this attenuation. For instance, the user 3 may speak louder, or may adjust how certain words are pronounced. For example, the user may put more emphasis on certain vowels that have a frequency that are more effected by the occlusion effect caused by the earcup 9 covering the user's ear. Although this compensation may sound "better" to the user 3, it may sound abnormal to others who are hearing the user 3 speak.

To improve own voice perception, the user 3 may simply remove the headphones 4, while speaking. This solution, however, may be insufficient when the user 3 is using the headphones 4 to participate in a computer-generated reality (CGR) session, such as a VR session in which the user takes advantage of the passive attenuation of the headphones 4 to become more immersed in a virtual environment. For instance, the headphones 4 may block out much of the background ambient noise from the room 5, which would otherwise distract the user 3 from (e.g., virtual) sounds being presented (or outputted) in the VR session. As described herein, to further reduce the background noise, the headphones 4 may also use an active noise cancellation (ANC) function. Although the combination of the passive attenuation due to the earcup 9 and the ANC function (e.g., active attenuation) may provide a more immersive experience to the user 3 who is participating in the VR session, vocal output by the user 3, for example while talking to another participant in the VR session may suffer. For example, in a VR session such as a virtual conference in which participants speak with one another (e.g., via avatars in the virtual conference), user 3 may adjust vocal output as described herein.

In one aspect, the headphones 4 may improve own voice perception through activation of an acoustic transparency function to cause the headphones to reproduce the ambient sounds (which may include the user's own voice) in the environment in a "transparent" manner, e.g., as if the headphones were not being worn by the user. More about the acoustic transparency function is described herein. Although own voice perception may improve, the active transparency function may reduce the immersive experience while the user participates in the VR session, by allowing ambient sounds from the physical environment to be heard along with sounds from the virtual environment by the user. Moreover, although the transparency function allows the air conduction paths through to the user's ears, these paths are only associated with (or correspond to) the physical environment. In other words, the reverberation path 7 represents the reverberation caused by room 5, when the user speaks. This path, however, may not correspond to "virtual reverberation" caused by a virtual environment that the user is participating in during the VR session and while the user speaks into the virtual environment (e.g., the virtual room's reverberation characteristics may differ from the physical room in which the user is actually located). Therefore, there is a need for an electronic device that reinforces the voice of a user who is participating in a CGR session, such as a VR session, while attenuating background ambient noises from the physical environment in order to provide a more immersive and acoustically accurate experience.

To accomplish this, the present disclosure describes an electronic device (e.g., an audio source device) that captures, using a (e.g., first) microphone, speech of the user and ambient noise of the environment as a first audio (e.g., microphone) signal and processes the first audio signal to 1) produce a "virtual" external direct path as a speech signal that contains less noise (or reduced noise) than the first audio signal and 2) produce a "virtual" reverberation path that accounts for reverberation caused by a virtual environment, when the user speaks into the virtual environment. The audio source device transmits the speech signal and/or the reverberation to an audio receiver device, such as the headphones 4, in order for the receiver device to drive a (e.g., second) speaker. As a result, when the user speaks while participating in a virtual environment, the speaker of the headphones 4 plays back these virtual air conduction paths to give the user the perception that the user is speaking in the virtual environment.

In order for a user's own voice to sound natural to the user, however, there needs to be a delay (or latency) of approximately 500 microseconds or less for the virtual external direct path. For instance, referring to FIG. 1, this delay is the time it takes for the user 3's speech to traverse the external direct path 6, or in other words, the time the direct sound and/or early reflections of an impulse response are measured at the user's ear. With respect to the virtual external direct path, however, this delay is from the time that the user 3 speaks to the time that the audio receiver device is to drive the speaker using the obtained speech signal. In one aspect, the reverberation path 7 may have other (e.g., longer) latency requirements. When the receiver device is coupled via a wire to the source device, latency may not be an issue. If, however, the receiver device is wireless and connects to the source device via a wireless personal area network (WPAN) connection, the latency requirement may not be satisfied. For instance, a WPAN connection via BLUETOOTH protocol may add over 250 milliseconds of end-to-end latency. This added latency may cause delayed auditory feedback (DAF) in which a user hears delayed speech spoken by the user. DAF can introduce mental stress to the user and in worst case scenarios prevent the user from speaking entirely.

The present disclosure provides a method in which the source device acoustically transmits the speech signal to the receiver device, which has lower latency than conventional transmission methods, such as BLUETOOTH protocol. For instance, the source device transmits the speech signal by driving a (e.g., first) speaker of the source device with the speech signal to cause the speaker to output a reproduction of the speech captured by the source device's microphone. The receiver device captures, using another (e.g., second) microphone, the reproduction of the speech produced by the speaker of the audio source device as an audio signal (e.g., a second audio signal), which is then used to drive the speaker of the receiver device. Acoustical transmission provides a low-latency transmission communication link between the source device and the receiver device, thereby reducing (and/or eliminating entirely) DAF.

Figure 2:
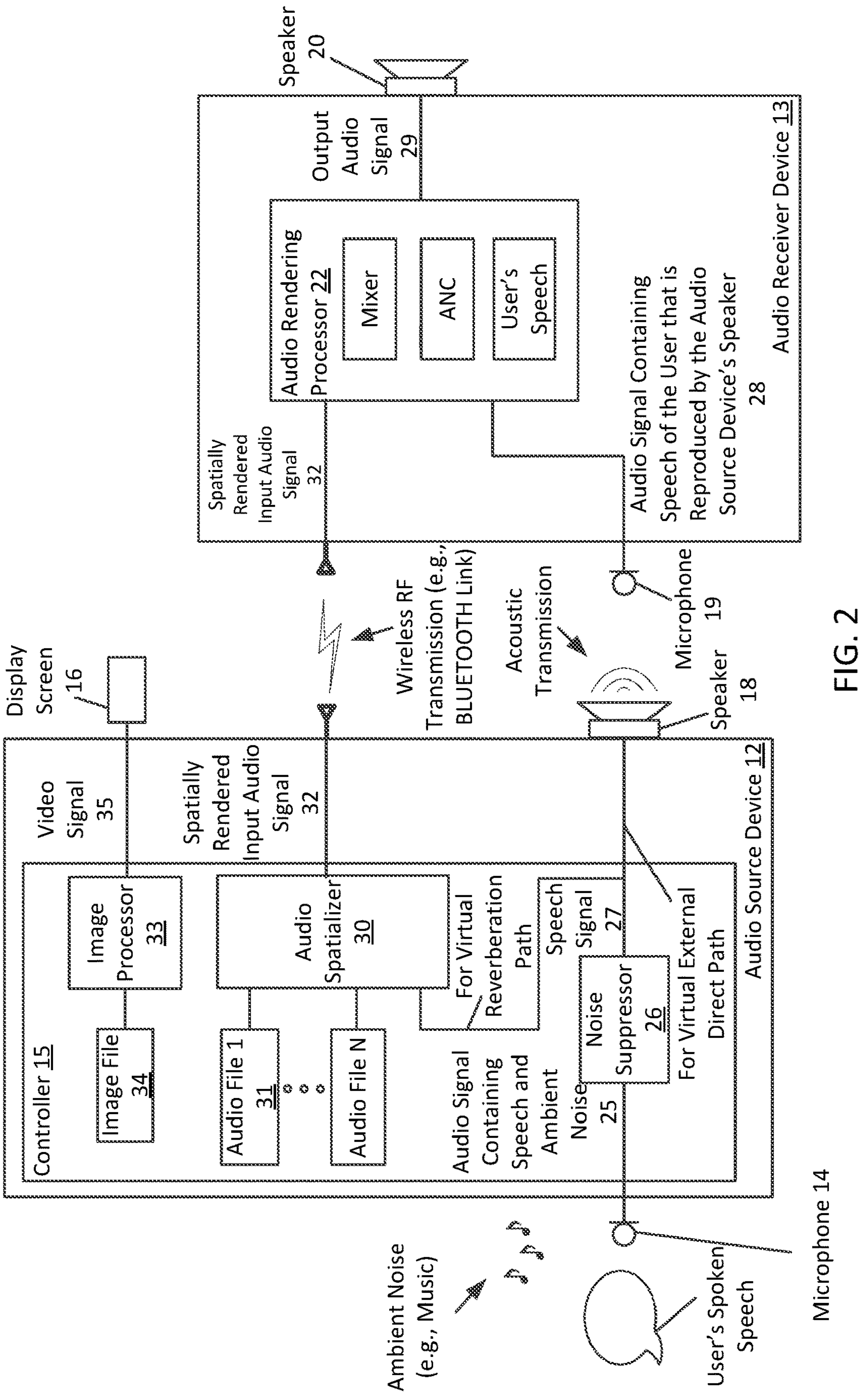
FIG. 2 shows a block diagram illustrating a computer system for reinforcing a user's own voice while in a computer-generated reality (CGR) session mode of one aspect of the disclosure.

FIG. 2 shows a block diagram illustrating a computer system for reinforcing a user's own voice while in a CGR session mode of an aspect of the disclosure. The computer system includes at least an audio source device 12 and an audio receiver device 13. This figure illustrates the computer system reinforcing the user's own voice, while the audio source device 12 and the audio receiver device 13 of the computer system operate together in one of several CGR session modes. Specifically, this figure illustrates a VR session mode (or first mode) during which the computer system produces a virtual reverberation path and/or a virtual external direct path in order to reinforce the user's own voice that is projected into a virtual environment (or setting) in which the user is participating.

In one aspect, the audio source device may be any electronic device that is capable of capturing, using a microphone, sound of an ambient environment as an audio signal (or audio data), and transmitting (e.g., wirelessly) the audio data to another device via acoustic transmission. Examples of such devices may include a headset, a head-mounted device (HMD), such as smart glasses, or a wearable device (e.g., a smart watch, headband, etc.). In one aspect, the device 12 is a HMD that is configured to have or to receive a display screen 16. For instance, with respect to receive the display screen 16, the HMD may be an electronic device that is configured to electrically couple with another electronic device that has a display screen (e.g., a smartphone).

In one aspect, the audio receiver device may be any electronic device that is capable of capturing, using a microphone, sound of the ambient environment as an audio signal and using the audio signal to drive a speaker contained therein. For instance, the receiver device 13 may be a pair of in-ear, on-ear, or over-the-ear headphones, such as headphones 4 of FIG. 1. In one aspect, the receiver device is at least one earphone (e.g., earbud) that is configured to be inserted into an ear canal of the user 3. In one aspect, the receiver device 13 may also be any electronic device that is capable of performing networking operations. For instance, the receiver device 13 may be a wireless electronic device that is configured to establish a wireless connection with another electronic device, such as the source device 12, over a wireless computer network, using e.g., BLUETOOTH protocol or a wireless area network. In one aspect, this wireless connection is paring the receiver device 13 with the source device 12 in order to allow the receiver device 13 to perform at least some operations that may otherwise be performed by the source device 12. For example, as described herein, the receiver device 13 may perform audio processing operations upon an audio signal obtained from the source device for output through a speaker of the receiver device 13.

In the case in which the audio receiver device 13 is an earphone (e.g., a wireless earbud for a user's right ear), the device 13 is configured to communicatively couple to (or pair with) a left wireless earbud. In one aspect, the left wireless earbud is configured to perform at least some of the operations described herein with respect to device 13. For instance, as described herein, the left wireless earbud may perform at least some of the operations to output the virtual external direct path and/or virtual reverberation paths. In another aspect, the left wireless earbud may stream audio content from the device 13.

The source device 12 includes at least one microphone 14, a controller 15, at least one display screen 16, and at least one speaker 18. The microphone 14 may be any type of microphone (e.g., a differential pressure gradient micro-electromechanical system (MEMS) microphone) that is configured to convert acoustic energy caused by sound waves propagating in an acoustic (e.g., physical) environment into an audio (e.g., microphone) signal. The speaker 18 may be an electrodynamic driver that may be specifically designed for sound output at certain frequency bands, such as a woofer, tweeter, or midrange driver, for example. In one aspect, the speaker 18 may be a "full-range" (or "full-band") electrodynamic driver that reproduces as much of an audible frequency range as possible. The speaker "outputs" or "plays back" audio by converting an analog or digital speaker driver signal into sound. In one aspect, the source device 12 includes a driver amplifier (not shown) for the speaker that can receive an analog input from a respective digital to analog converter, where the later receives its input digital audio signal from the controller 15.

In one aspect, the speaker 18 may be an "extra-aural" speaker that may be positioned on (or integrated into) a housing of the source device 12 and arranged to direct (project or output) sound into the physical environment in which the audio source device is located. In one aspect, the speaker 18 may direct sound towards or near the ear of the user, as described herein. This is in contrast to earphones (e.g., or headphones 4 as illustrated in FIG. 1) that produce sound directly into a respective ear of the user 3 and make use of a sealed cavity in or around the ear. In one aspect, the source device 12 may include two or more extra-aural speakers that form a speaker array that is configured to produce spatially selective sound output. For example, the array may produce directional beam patterns of sound that are directed towards locations within the environment, such as the ears of the user 3. In another aspect, the array may direct the directional beam patterns towards one or more microphones (e.g., microphone 19) of the audio receiver device 13. Similarly, the source device 12 may include two or more microphones that form a microphone array that is configured to direct a sound pickup beam pattern towards a particular location, such as the user's mouth. More about producing directional beam patterns is described herein.

The display screen 16, as described herein, is configured to display image data and/or video data (or signals) to the user 3 of the source device 12. In one aspect, the display screen 16 may be a miniature version of known displays, such as liquid crystal displays (LCDs), organic light-emitting diodes (OLEDs), etc. In another aspect, the display may be an optical display that is configured to project digital images upon a transparent (or semi-transparent) overlay, through which a user can see. The display screen 340 may be positioned in front of one or both of the user's eyes.

The controller 15 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller 15 is configured to perform audio/image processing operations, networking operations, and/or rendering operations. For instance, the controller is configured to process one or more audio signals captured by one or more microphones (e.g., microphone 14) to produce and acoustically transmit a speech signal to the receiver device 13 for playback. In one aspect, the controller 13 is configured to also present a CGR session, in which the user of the source device 12 is a participant. More about how the controller 15 performs these operations is described herein.

The audio receiver device 13 includes at least one microphone 19, at least one speaker 20, and an audio rendering processor 22. In some aspects, the microphone 14 of the audio source device 12 may be closer to the user's mouth, than the microphone 19 of the audio receiver device. The audio rendering processor 22 is configured to obtain at least one audio signal from the audio source device. In one aspect, the processor 22 is configured to perform at least one audio processing operation upon the audio signal and to use the (e.g., processed) audio signal to drive the speaker 20. In one aspect, the speaker 20 may be a part of a pair of in-ear, on-ear, or over-the-ear headphones, which when driven with an audio signal causes the speaker 20 to direct sound into a user's ear. In one aspect, the audio rendering process 22 may be implemented as a programmed, digital microprocessor entirely, or as a combination of a programmed processor and dedicated hardwired digital circuits such as digital filter blocks and state machines.

In one aspect, the microphone 19 and/or the speaker 20 may be similar to the microphone 14 and/or the speaker 18 of the audio source device 12, respectively. In another aspect, device 12 and/or device 13 may include more or less elements described herein. For instance, the source device 12 may not include a display screen 16, or may include more than one speaker/microphone. In another aspect, the source device may include a camera, as described herein.

The process in which the computer system reinforces the user's own voice while in the VR session mode will now be described. The audio source device 12 captures, using microphone 14, speech spoken by the user and ambient noise (illustrated as music) of the physical environment (e.g., the room 5) as a (e.g., first) audio signal 25. In one aspect, the ambient noise includes undesired sounds, meaning sounds that may interfere with the virtual external direct path. In contrast, the speech that is spoken by the user is user-desired audio content that the system uses to reinforce the user's own voice while in the virtual environment. The controller 15 obtains the audio signal 25 and performs noise suppression (or reduction) operations (at the noise suppressor 26). Specifically, the noise suppressor 26 processes the signal 25 by reducing (or eliminating) the ambient noise from the signal 25 to produce a speech signal 27 (or audio signal) that contains mostly the speech 23 captured by the microphone 14. For instance, the noise suppressor 26 may process the signal 25 in order to improve its signal-to-noise ratio (SNR). To do this, the suppressor 26 may spectrally shape the audio signal 25 by applying one or more filters (e.g., a low-pass filter, a band-pass filter, etc.) upon the audio signal 25 to reduce the noise. As another example, the suppressor 26 may apply a gain value to the signal 25. In one aspect, the suppressor 26 may perform any method to process the audio signal 25 in order to reduce noise in the audio signal 25 to produce a speech signal.

From the speech signal 27, the computer system may produce the virtual external direct path 36, as follows. The controller 15 drives the (e.g., first) speaker 18 with the speech signal 27 to cause the speaker 18 to output a (e.g., reproduction) of the captured speech 23. In one aspect, the source device 15 drives the speaker 18 to acoustically transmit the speech signal to the audio receiver device 13, which captures, using a (e.g., second) microphone 19, the reproduction of the speech signal as a (e.g., second) audio signal 28. In one aspect, the physical space (or distance) between the speaker 18 and microphone 19 may be minimized in order to reduce any adverse effect of ambient sound. For example, referring to FIG. 1, when the receiver device is a pair of headphones 4, the microphone 19 may be positioned on (or integrated into) the earcup 9 of the headphones 4. In this example, the source device 12 may be a HWD that includes a strap that wraps around the user's head. As a result, the speaker 18 may be positioned on the strap, and within a close proximity (e.g., one inch, two inches, etc.) to the microphone 19.

The audio rendering processor 22 of the receiver device 13 is configured to obtain (or receive) the audio signal 28, to perform signal processing operations thereon. In one aspect, the audio rendering processor 22 may perform at least some of these operations, while in the VR session mode. In one aspect, the audio rendering processor 22 is configured to perform digital signal processing ("DSP") operations upon the audio signal 28 to improve the user's speech. For instance, along with capturing the reproduction of the user's speech, the microphone 19 may also capture ambient sound (e.g., the music and/or the speech spoken by the user). In this case, the audio rendering processor 22 may perform at least some of the noise suppression operations performed by the noise suppressor 26 in order to reduce at least some of the captured ambient noise.

In one aspect, the audio rendering processor 22 may perform speech enhancement operations upon the audio signal 28, such as spectrally shaping the audio signal to amplify frequency content associated with speech, while attenuating other frequency content. As yet another example, to enhance the speech, the processor 22 may apply a gain value to the audio signal 29 to increase the output sound level of the signal. The audio rendering processor produces an output audio signal 29, from the audio signal 28, and uses the audio signal 29 to drive the (e.g., second) speaker 20 to output the reproduced speech contained within the audio signal 28.

In one aspect, the audio rendering processor 22 is configured to activate an active noise cancellation (ANC) function that causes the speaker 20 to produce anti-noise in order to reduce ambient noise from the environment that is leaking into the user's ear. In one aspect, the processor 22 is configured to active the ANC function while in the VR session mode. In other aspects, the processor 22 is configured to deactivate the ANC function while in other modes (e.g., a MR session mode, as described herein). In one aspect, the noise may be the result of an imperfect seal of a cushion of the earcup 9 that is resting upon the user's head/ear. The ANC may be implemented as one of a feedforward ANC, a feedback ANC, or a combination thereof. As a result, the processor 22 may receive a reference audio signal from a microphone that captures external ambient sound, such as microphone 19, and/or the processor 22 may receive a reference (or error) audio signal from another microphone that captures sound from inside the user's ear. The processor 22 is configured to produce one or more anti-noise signals from at least one of the audio signals.

The audio rendering processor 22 is configured to mix the anti-noise signal(s) with the (e.g., processed or unprocessed) audio signal 28 to produce the output audio signal 29. In one aspect, the audio rendering processor 22 may perform matrix mixing operations that mixes and/or routes multiple input audio signals to one or more outputs, such as the speaker 20. In one aspect, the processor 22 may perform digital and/or analog mixing.

In one aspect, the output signal 29 that includes the speech 23 of the user may represent a reproduction of the external direct path 6 that was passively (and/or actively) attenuated as a result of the user 3 wearing the audio receiver device 13, such as the headphones 4 illustrated in FIG. 1. In some aspects, the virtual external direct path may be the same or similar to the external direct path 6 that is produced by the user's speech in the physical environment. This is because both paths represent a direct path from the user's mouth, to the user's ear, which may not change significantly between the physical environment and the virtual environment.

Returning to the audio source device 12, the computer system may produce the virtual reverberation path 37 from the speech signal 27 produced by the noise suppressor 26, as follows. The controller 15 includes an audio spatializer 30 that is configured to spatially render audio file(s) 31 associated with the VR session to produce spatial audio in order to provide an immersive audio experience to the user of the audio source device 12 (and/or audio receiver device 13). In one aspect, the audio file(s) 31 may be obtained locally (e.g., from local memory) and/or the audio file(s) 31 may be obtained remotely (e.g., from a server over the Internet). The audio files 31 may include input audio signals or audio data that contains audio content of sound(s) that are to be emitted from virtual sound sources or are associated with virtual objects within the VR session. For instance, in the case of the virtual conference, the files may include audio content associated with other users (e.g., speech) who are participating in the conference and/or other virtual sounds within the virtual conference (e.g., a door opening in the virtual conference room, etc.). In one aspect, the spatializer 30 spatially renders the audio file(s) 31 by applying spatial filters that may be personalized for the user of the device 12 in order to account for the user's anthropometrics. For example, the spatializer may perform binaural rendering by applying the spatial filters (e.g., head-related transfer functions (HRTFs)) to the input audio signal(s) of the audio file(s) to produce spatially rendered input audio signals or binaural signals (e.g., a left audio signal for a left ear of the user, and a right audio signal for a right ear of the user). The spatially rendered audio signals produced by the spatializer are configured to cause speakers (e.g., speaker 20) to produce spatial audio cues to give a user the perception that sounds are being emitted from a particular location within an acoustic space.

In one aspect, HRTFs may be general or personalized for the user, but applied with respect to an avatar of the user 2 that is within the VR setting. As a result, spatial filters associated with the HRTFs may be applied according to a position of the virtual sound sources within the VR setting with respect to an avatar to render 3D sound of the VR setting. This 3D sound provides an acoustic depth that is perceived by the user at a distance that corresponds to a virtual distance between the virtual sound source and the user's avatar. In one aspect, to achieve a correct distance at which the virtual sound source is created, the spatializer 30 may apply additional linear filters upon the audio signal, such as reverberation and equalization.

In one aspect, the audio spatializer 30 is configured to obtain the speech signal 27 produced by the noise suppressor 26, and determine (or produce) a virtual reverberation path that represents reverberation caused by the virtual environment in which user 3 is participating. Specifically, the spatializer 30 determines an amount of virtual reverberation caused by the virtual environment based on the speech of the user (and virtual room acoustics of the virtual environment). For example, the spatializer 30 determines an amount of reverberation caused by a virtual conference room while the user is speaking (e.g., while an avatar associated with the user projects speech into a virtual room). In one aspect, the spatializer 30 may determine the virtual reverberation path based on room acoustics of the virtual environment, which may be determined based on the physical dimensions of the room and/or any objects contained within the room. For instance, the spatializer 30 may obtain the physical dimensions of the virtual room and/or any virtual objects contained within the room from the image processor 33 and determine room acoustics of the virtual room, such as a sound reflection value, a sound absorption value, or an impulse response for the virtual room. The spatializer 30 may use the room acoustics to determine an amount of virtual reverberation that would be caused when the speech signal 27 is outputted into the virtual environment. Once determined, the spatializer 30 may apply (or add) the determined amount of reverberation to the spatially rendered audio file(s) 31 to produce (at least one) spatially rendered input audio signal 32 (or one or more binaural signals) that includes the virtual reverberation path. In one aspect, the audio spatializer 30 may add the reverberation to the input audio signal of the file 31 before (or after) applying the spatial filter(s). In some aspects, when there are no other virtual sound sources, the input audio signal 32 includes the determined virtual reverberation.

The audio source device 12 wirelessly transmits the spatially rendered input audio signal(s) 32, via, e.g., BLUETOOTH protocol, to the audio receiver device 13. In one aspect, the input audio signal(s) 32 may be transmitted via BLUETOOTH protocol that does not have as low latency as acoustic transmission, since the virtual reverberation path represents late reflections that do not need to be reproduced as quickly as the virtual direct path. The audio receiver device 13 obtains the spatially rendered input audio signal(s) 32 and the audio rendering processor 22 mixes the input audio signal(s) with the audio signal 28 to produce a combined output audio signal 29, to be used to drive the speaker 20.

In one aspect, in addition to (or in lieu of) audibly presenting the VR session, the audio source device 12 may present a visual representation of the VR session through the display screen 16. Specifically, the controller 15 includes an image processor 33 that is configured to perform VR session rendering operations to render the visual representation of the CGR session as a video signal 35. For instance, the image processor 33 may obtain image file(s) 34 (either from local memory and/or from a server over the Internet) that represents graphical data (e.g., three-dimensional (3D models, etc.) and 3D render the VR session. The display screen 16 is configured to obtain the video signal that contains the visual representation and display the visual representation.

In one aspect, the audio source device 12 may display the CGR session from a (e.g., first-person) perspective of an avatar associated with the user of the device 12. In some aspects, the controller 15 may adjust the spatial and/or visual rendering of the VR session according to changes in the avatar's position and/or orientation. In another aspect, at least some of the rendering may be performed remotely, such as by a cloud-based CGR session server that may host the virtual session. As a result, the audio source device 12 may obtain the renderings of the session for presentation.

Figure 3:
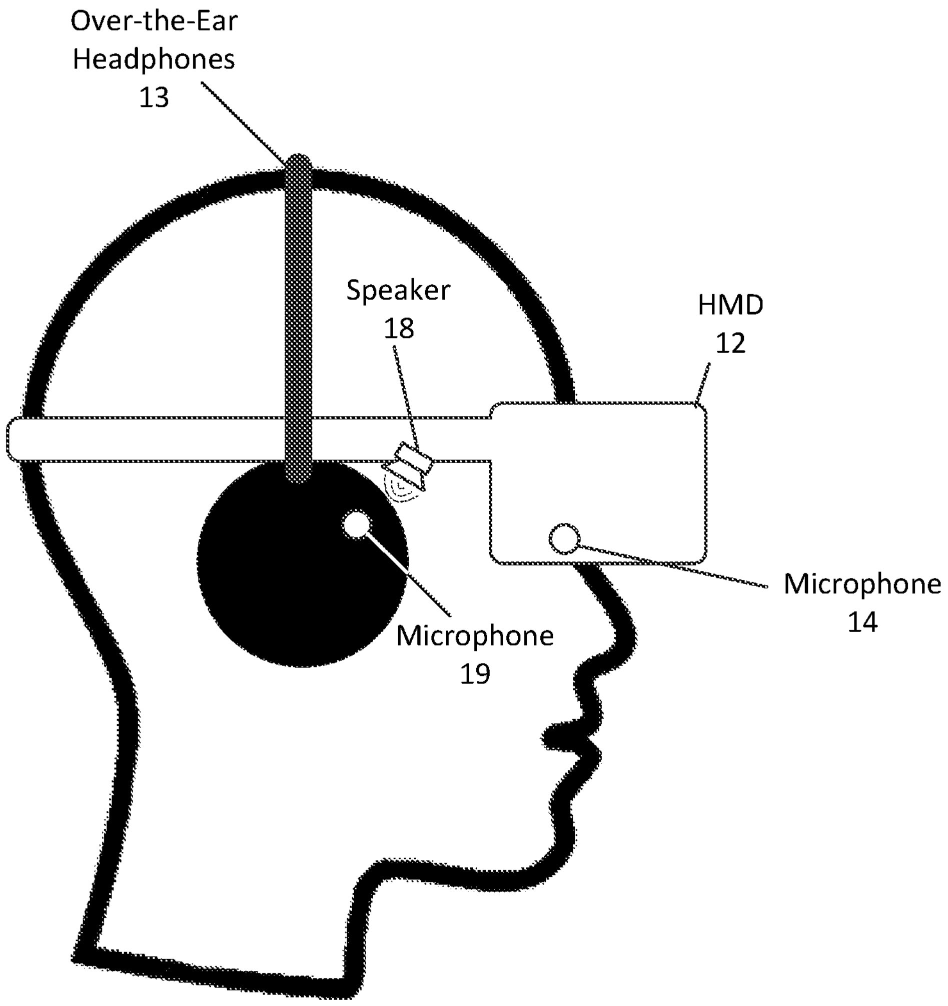
FIG. 3 shows an example the computer system for reinforcing the user's own voice having a head-mounted device (HMD) and over-the-ear headphones.

FIG. 3 shows an example of the computer system for reinforcing a user's own voice. Specifically, this figure illustrates the audio source device as a HMD and the audio receiver device as over-the-ear headphones 13, both of which are being worn (or are in-use) by the user 3. A frontal portion of the HMD (which includes the display screen 16) is positioned in front of the user's eyes and is being held in place (or supported) by a strap that is surrounding the user's head. The microphone 14 is positioned on the frontal portion of the HMD such that it will be near the user's mouth during normal operation (or while the HMD is in use). The speaker 18 is positioned on the strap of the HMD and is positioned at or near the user's ears during normal operation of the HMD. The ear cup of the headphones 13 includes microphone 19. In one aspect, the microphone 14 is positioned closer to the user's mouth than microphone 19, while both devices are being worn by the user.

Figure 4:
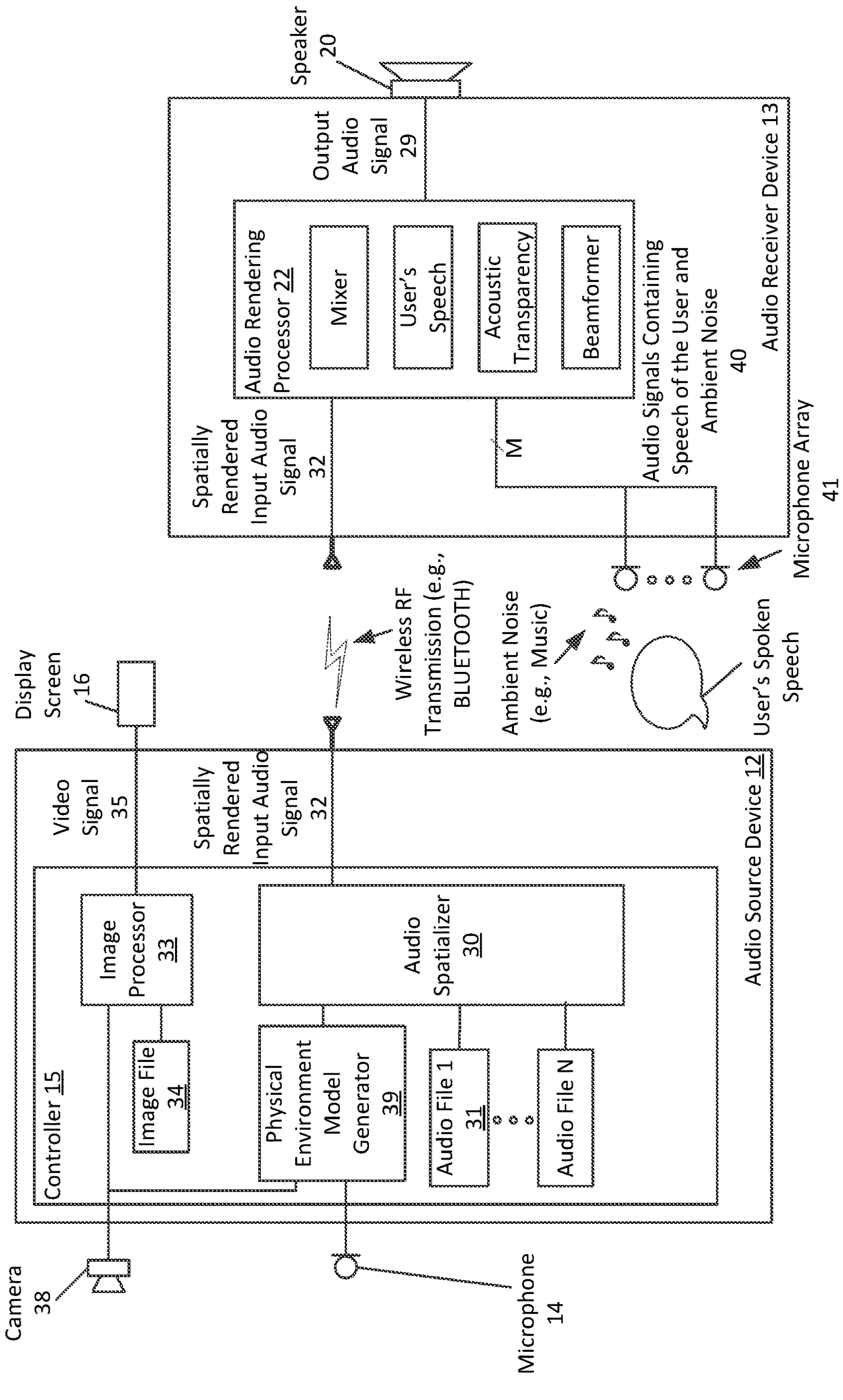
FIG. 4 shows a block diagram illustrating a computer system for reinforcing a user's own voice while in another CGR session mode of one aspect of the disclosure.

FIG. 4 shows a block diagram illustrating the computer system for reinforcing a user's own voice while in another CGR session mode of an aspect of the disclosure. This figure illustrates the computer system reinforcing the user's own voice, while the source device 12 and the receiver device 13 operate together in a MR session mode (or second mode). The difference between the MR session mode and the VR session mode illustrated in FIG. 2 is that during this mode the system may present sensory input(s) from the physical environment to the user. For instance, as described herein, the audio receiver device 13 may activate the transparency function to allow the air conductions paths to pass through to the user's ears. Thus, while in this mode, the audio source device may not need to acoustically transmit speech to the audio receiver device (e.g., by preventing speaker 18 from outputting a reproduction of the user's speech). In addition, while in the MR session mode, at least some of the physical environment may be presented on the display screen 16. This is in contrast to the VR session mode in which the virtual environment is presented to the user with minimal (or no) sensory input from the physical environment in order to totally immerse the user within the virtual world.

Since this mode may include sensory input(s) from the physical environment, the audio receiver device 13 is configured to "pass through" at least one of the reverberation path 7 and the external direct path 6, as shown in FIG. 1. In this figure, the audio receiver device 13 includes two or more microphones (which may include microphone 19) to make up a microphone array 41. Each microphone captures the user's spoken speech and/or the noise as "M" audio signals 40. The audio rendering processor 22 is configured to process at least some of the audio signals produced by the microphones of the microphone array 24 to output at least a portion of the speech and/or the ambient noise from the physical environment.

The audio rendering processor 22 includes a sound pickup microphone beamformer that is configured to process the microphone signals 40 produced by the microphone array 41 to form at least one directional beam pattern in a particular direction, so as to be more sensitive to one or more sound source locations in the physical environment. To do this, the beamformer may process one or more of the microphone signals 40 by applying beamforming weights (or weight vectors). Once applied, the beamformer produces at least one sound pickup output beamformer signal (hereafter may be referred to as "output beamformer audio signal" or "output beamformer signal") that includes the directional beam pattern. In this case, the audio receiver device 13 may direct the directional beam pattern towards the user's mouth in order to maximize the signal-to-noise ratio of the captured speech. In one aspect, the output audio signal 29 may be (or include) the at least one output beamformer signal.

The audio rendering processor 22 also includes an acoustic transparency function that is configured to render at least some of the audio signals produced by the microphone array 41 to reproduce at least some of the ambient noise and/or speech. Specifically, this function enables the user of the receiver device 13 to hear sound from the physical environment more clearly, and preferably in a manner that is transparent as possible. To do this, the audio rendering processor 22 obtains the audio signals 40 that includes a set of sounds of the physical environment, such as the music and the speech. The processor 22 processes the audio signals 40 by filtering the signals through transparency filters to produce filtered signals. In one aspect, the processor 22 applies a specific transparency filter for each audio signal. In some aspects, the filters reduce acoustic occlusion due to the headphones being in, on, or over the user's ear, while also preserving the spatial filtering effect of the user's anatomical features (e.g., head, pinna, shoulder, etc.). The filters may also help preserve the timbre and spatial cues associated with the actual ambient sound. Thus, in one aspect, the filters may be user specific, according to specific measurements of the user's head. For instance, the audio rendering processor may determine the transparency filters according to a HRTF or, equivalently, head related impulse response (HRIR) that is based on the user's anthropometrics. Each of the filtered signals may be combined, and further processed by the processor 22 (e.g., to perform beamforming operations, ANC function, etc.) to produce the output audio signal 29.

In one aspect, the controller 15 is configured to process input audio signals associated with virtual objects presented in the MR session by accounting for room acoustics of the physical environment in order for the MR setting to match (or closely match) the physical environment in which the user is located. To do this, the controller 15 includes a physical environment model generator 39 that is configured to estimate a model of the physical environment and/or measure acoustic parameters of the physical environment.

The estimated model can be generated through computer vision techniques such as object recognition. Trained neural networks can be utilized to recognize objects and material surfaces in the image. Surfaces can be detected with 2D cameras that generate a two dimensional image (e.g., a bitmap). 3D cameras (e.g., having one or more depth sensors) can also be used to generate a three dimensional image with two dimensional parameters (e.g., a bitmap) and a depth parameter. Thus, camera 38 can be a 2D camera or a 3D camera. Model libraries can be used to define identified objects in the scene image.

The generator 39 obtains a microphone signal from microphone 14 and from the signal (e.g., either an analog or digital representation of the signal) may generate one or more measured acoustic parameters of the physical environment. It should be understood that 'generating' the measured acoustic parameters includes estimating the measured acoustic parameters of the physical environment extracted from the microphone signals.

In one aspect, generating the one or more measured acoustic parameters includes processing the audio signals to determine a reverberation characteristic of the physical environment, the reverberation characteristic defining the one or more measured acoustic parameters of the environment. In one aspect, the one or more measured acoustic parameters can include one or more of the following: a reverberation decay rate or time, a direct to reverberation ratio, a reverberation measurement, or other equivalent or similar measurements. In one aspect, the one or more measured acoustic parameters of the physical environment are generated corresponding to one or more frequency ranges of the audio signals. In this manner, each frequency range (for example, a frequency band or bin) can have a corresponding parameter (e.g. a reverberation characteristic, decay rate, or other acoustic parameters mentioned). Parameters can be frequency dependent.

In one aspect, generating the one or more measured acoustic parameters of the physical environment includes extracting a direct component from the audio signals and extracting a reverberant component from the audio signals. A trained neural network can generate the measured acoustic parameters (e.g., a reverberation characteristic) based on the extracted direct component and the extracted reverberant component. The direct component may refer to a sound field that has a single sound source with a single direction, or a high directivity, for example, without any reverberant sounds. A reverberant component may refer to secondary effects of geometry on sound, for example, when sound energy reflects off of surfaces and causes reverberation and/or echoing.

It should be understood that the direct component may contain some diffuse sounds and the diffuse component may contain some directional, because separating the two completely can be impracticable and/or impractical. Thus, the reverberant component may contain primarily reverberant sounds where the directional components have been substantially removed as much as practicable or practical. Similarly, the direct component can contain primarily directional sounds, where the reverberant components have been substantially removed as much as practicable or practical.

The audio spatializer 30 can process an input audio signal (e.g., of audio file 1 31) using the estimated model and the measured acoustic parameters, and generate output audio channels (e.g., signal 32) having a virtual sound source that may have a virtual location in the virtual (or MR) environment. In one aspect, the spatializer 30 may apply at least one spatial filter upon the generated output audio channels to produce the spatially rendered input audio signal 32.

In one aspect, in addition to (or in lieu of) audibly presenting the MR session, the audio source device 12 may present a visual representation of the MR session through the display screen 16. In one aspect, the audio source device 12 may present the visual representation as virtual objects overlaid (or superimposed) over a physical setting or a representation, as described herein. To do this, the audio source device 12 includes a camera 38 that is configured to capture image data (e.g., digital images) and/or video data (which may be represented as a series of digital images) that represents a scene of a physical setting (or environment) in the field of view of the camera 38. In one aspect, the camera 38 is a complementary metal-oxide-semiconductor (CMOS) image sensor that is capable of capturing digital images including image data that represent a field of view of the camera 38, where the field of view includes a scene of an environment in which the device 12 is located. In some aspects, the camera 38 may be a charged-coupled device (CCD) camera type. The image processor 33 is configured to obtain the image data captured by the camera 38 and/or image files 34 that may represent virtual objects within the MR session (and/or virtual objects within the VR session as described herein) and render the video signal 35 for presentation on the display screen 16. In one aspect, the display screen 16 may be at least partially transparent in order to allow the user to view the physical environment through the screen 16.

In one aspect, the computer system may seamlessly transition between both modes to prevent an abrupt change in audio (and/or video) output by the audio source device 12 and/or the audio receiver device 13. For instance, the audio source device 12 may obtain a user-command to transition from preventing the VR setting in the VR setting mode to presenting a MR setting in the MR setting mode. In one aspect, the user-command may be obtained via a user interface (UI) item selection on the display screen of the audio source device, or a UI item presented in the virtual environment. In another aspect, the user-commend may be through a selection of a physical button on the audio source device 12 (or the audio receiver device 13). As another example, the user-command may be a voice command obtained via a microphone (of the audio source device) and processed by the controller 15. In response to obtaining the user-command, the audio source device may cease to use the amplified speech signal to drive the speaker 18 to output the amplified (or reproduction) of the user's speech. Contemporaneously, the microphone (or microphone array) of the audio receiver device 13 may begin to capture sound of the environment in order to process and output speech as well as ambient noise. For instance, the audio receiver device 13 may cease outputting anti-noise through the speaker 20 (e.g., by disabling the ANC function) and/or activate the transparency function. In one aspect, the computer system may transition between the two modes by causing the audio source device 12 to continue to output amplified speech and cause the audio receiver device to cease outputting anti-noise and activate the transparency function for a period of time (e.g., two seconds).

Figure 5:
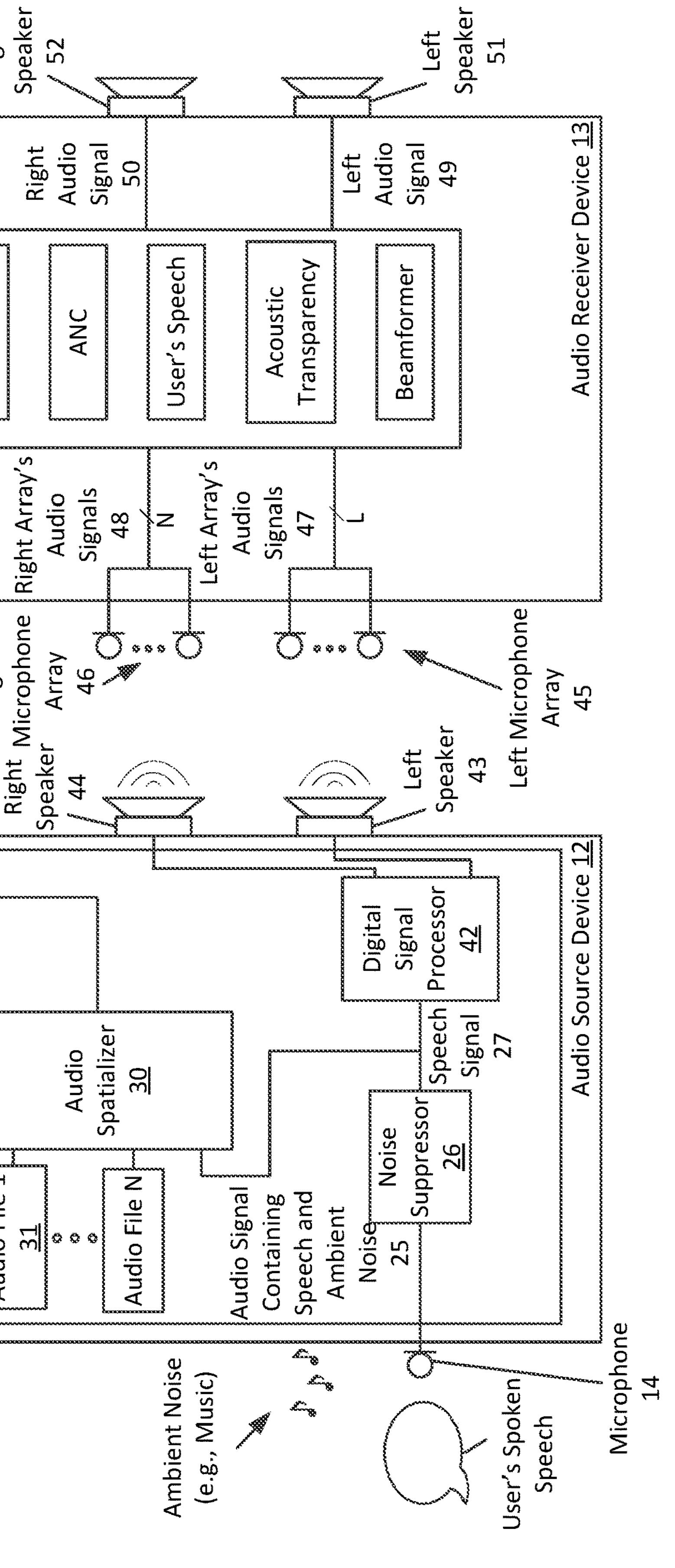
FIG. 5 shows a block diagram illustrating a computer system for reinforcing a user's own voice by using several beamforming arrays of another aspect of the disclosure.

FIG. 5 shows a block diagram illustrating the computer system for reinforcing a user's own voice by using several beamforming arrays of another aspect of the disclosure. Specifically, this figure illustrates a variation of the computer system shown in FIG. 2, in which rather use one microphone (e.g., microphone 19) to capture the reproduction of the user's speech, the audio receiver device 23 includes two (or more) microphone beamforming arrays 45 and 46 that are configured to produce a directional beam pattern directed towards a different speaker of the audio source device 12. In one aspect, when the audio receiver device 13 is an electronic device that wraps (at least partially) around the user's head, such as a pair of headphones with earcups on different ears of the user, the microphone arrays may be positioned on either side of the user's head. For instance, in the case of headphones, the left (or left-sided) microphone array 45 may be positioned on (or integrated into) a left earcup of the headphones, and a right (or right-sided) microphone array 46 may be positioned on (or integrated into) a right earcup of the headphones. In one aspect, however, the audio receiver device 13 may include one left microphone and one right microphone, where each microphone produces an audio signal that may contain speech produced by respective left and right speakers, as described herein.

The process of using multiple beamforming arrays is as follows. Specifically, the controller 15 of the audio source device 12 processes the speech signal 27 for output through multiple speakers separately from one another. In one aspect, each of the speakers 43 and 44 may be positioned on a respective side of the user's head. For instance, when the audio source device is a pair of smart glasses, the left (or left-sided) speaker 43 may be positioned on a left temple of the glasses, while the right (or right-sided) speaker 44 may be positioned on a right temple of the glasses. In one aspect, the speakers may be positioned anywhere on the device 12. In one aspect, speaker 18 may be either the left speaker 43 or the right speaker 44.

The controller 15 includes a digital signal processor 42 that is configured to receive the speech signal 27 and perform audio processing operations thereon. For instance, the processor 42 may split the speech signal 27 into two separate paths, each path to drive the left speaker 43 and the right speaker 44 simultaneously (or at least partially simultaneously). In one aspect, the digital signal processor 42 may perform other operations. For instance, the processor 42 may apply a gain value to the signal to produce an amplified speech signal, which when used to drive the speaker has a higher output level than the signal 27. In one aspect, by amplifying the speech outputted through one (or both) of the speakers, the sensitivity of the microphone (or microphones) of the audio receiver device may be reduced in order to reduce the amount of ambient noise captured by the audio receiver device 13. Specifically, the audio receiver device may reduce the microphone volume of at least one microphone. The processor 42 may also spectrally shape the speech signal 27 to produce an adjusted signal for each speaker. In one aspect, each signal that is used to drive each speaker 43 and 44 may be the same, or each may be different from one another.

Each of the arrays 45 and 46 is configured to produce at least one directional beam pattern towards a respective speaker. For instance, the right array 46 is configured to produce a beam pattern towards the right speaker 44, and the left array 45 is configured to produce a beam pattern towards the left speaker 43. Specifically, each array 45 and 46 produces two or more audio signals 47 and 48, respectively. The sound pickup microphone beamformer of the digital signal processor 22 (as previously described) is configured to receive both groups of signals 47 and 48, and produce at least one output beamformer signal for each array that includes a respective directional beam pattern. The digital signal processor 22 is further configured to output the respective output beamformer signals through a respective speaker 51 and/or 52 of the receiver device 13. For example, the digital signal processor 22 may perform matrix mixer operations in order to mix a left binaural signal of the binaural signals 53 with a left (or left-sided) output beamformer signal that includes a beam pattern produced by the microphone array 45 to produce the left audio signal 49, which is used to drive the left speaker 51. Similarly, the processor 22 may mix a right binaural signal of the binaural signals 53 with a right (or right-sided) output beamformer signal that includes a beam pattern produced by the microphone array 46 to produce the right audio signal 50, which is used to drive the right speaker 52.

In one aspect, rather than including a left-sided microphone array 45 and a right-sided microphone array 46, the audio receiver device 13 may include one microphone on each side of the audio receiver device. In another aspect, the audio receiver device 13 may use only a portion of the microphones of each (or one) array 45 and/or 46 to capture sound produced by the speakers of the audio source device.

In one aspect, at least a portion of the output beamformer signal that includes a beam pattern produced by either array 45 and/or 46 may be used to drive both speakers 51 and 52. For instance, generally a person's ears are structurally the same (or similar) to each other and both ears are positioned at a same (or similar) distance away from the person's mouth. As a result, when a person speaks in a physical environment, both ears receive the same (or similar) speech (e.g., at similar levels and/or having similar spectral content). Thus, when reproducing the virtual external path, the audio receiver device 13 may use audio content captured by one array (e.g., the left array 47) to drive both the left speaker 51 and the right speaker 52.

Figure 6:
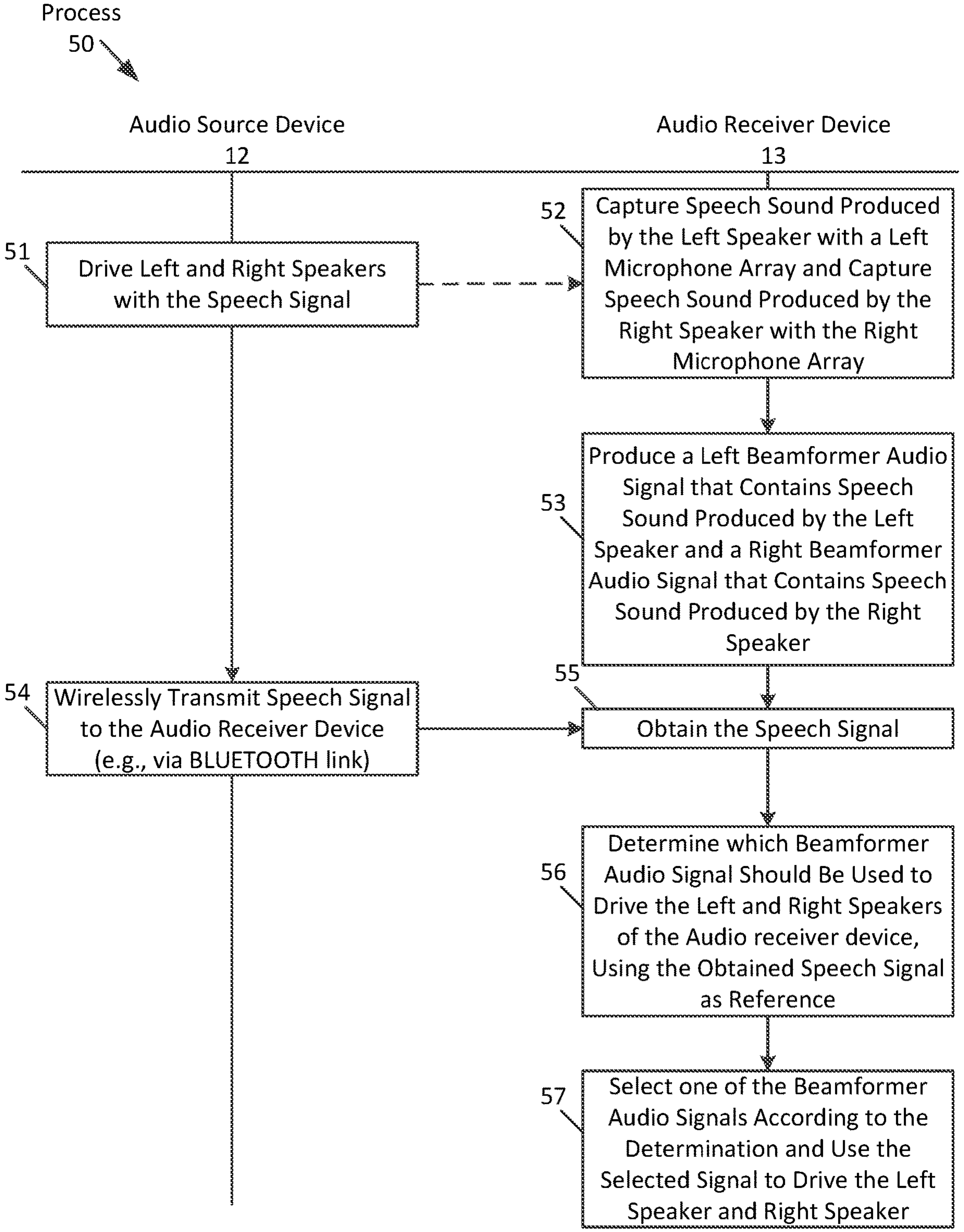
FIG. 6 is a flowchart of one aspect of a process for an audio receiver device to determine which of several output beamformer audio signals is to be used as a speech signal for output by the audio receiver device.

FIG. 6 is a flowchart of one aspect of a process 50 for an audio receiver device 13 to determine which of several output beamformer signals is to be used as a speech signal for output by the audio receiver device. Specifically, this figure illustrates a process 50 of how the processor 22 of the audio receiver device determines whether to drive speakers 51 and/or 52 with a beam pattern produced by either array 47 and 48, or a combination thereof.

The process 50 begins by the audio source device 12 driving the left speaker 43 and the right speaker 44 with the speech signal 27 (at block 51). In one aspect, as described herein, both speakers may be driven with a processed speech signal produced by the digital signal processor 42. The audio receiver device 13 captures sound produced by left speaker 43 with the left microphone array 45, and captures sound produced by the right speaker 44 with the right microphone array 48 (at block 52). The audio receiver device 13 produces a left beamformer audio signal that contains speech sound produced by the left speaker 43, and a right beamformer audio signal that contains speech sound produced by the right speaker 44 (at block 53). In one aspect, the processor 22 may process both beamformer audio signals to reduce noise, as described herein. The audio source device 12 wirelessly transmits the speech signal 27 to the audio receiver device 13 (e.g., via BLUETOOTH) (at block 54). The audio receiver device 13 obtains the speech signal (at block 55). The audio receiver device 13 determines which beamformer audio signal should be used to drive the left and right speakers 51 and 52, using the obtained speech signal as a reference signal (at block 56). Specifically, the audio receiver device 13 may compare the speech signal to both beamformer audio signals to determine which beamformer audio signal is more similar to the speech signal (e.g., based on a comparison of spectral content). In one aspect, the audio receiver device 13 may compare the speech signal's signal-to-noise ratio to both beamformer audio signals to determine which beamformer signal is more similar to the speech signal. In another aspect, the receiver device 13 may select the beamformer audio signal that has a higher signal-to-noise ratio than the other beamformer audio signal. The audio receiver device 13 may then select the beamformer audio signal that is more similar to the speech signal and drive the left and right speakers 51 and 52 with the selected beamformer audio signal (at block 57).

In one aspect, the audio receiver device 13 may drive the left and right speakers with a combination of both the left and right beamformer audio signals. In particular, the processor 22 may combine different portions of both beamformer audio signals to produce a combined beamformer audio signal. For example, a left side of the user's head may experience more low frequency noise (e.g., wind noise) than a right side of the user's head. As a result, the left beamformer audio signal may include more low frequency noise than the right beamformer audio signal. Thus, the processor 22 may extract high frequency content from the left beamformer audio signal and combine it with low frequency content from the right beamformer audio signal to produce the combined signal for output through the left speaker 51 and the right speaker 52.

Figure 7:
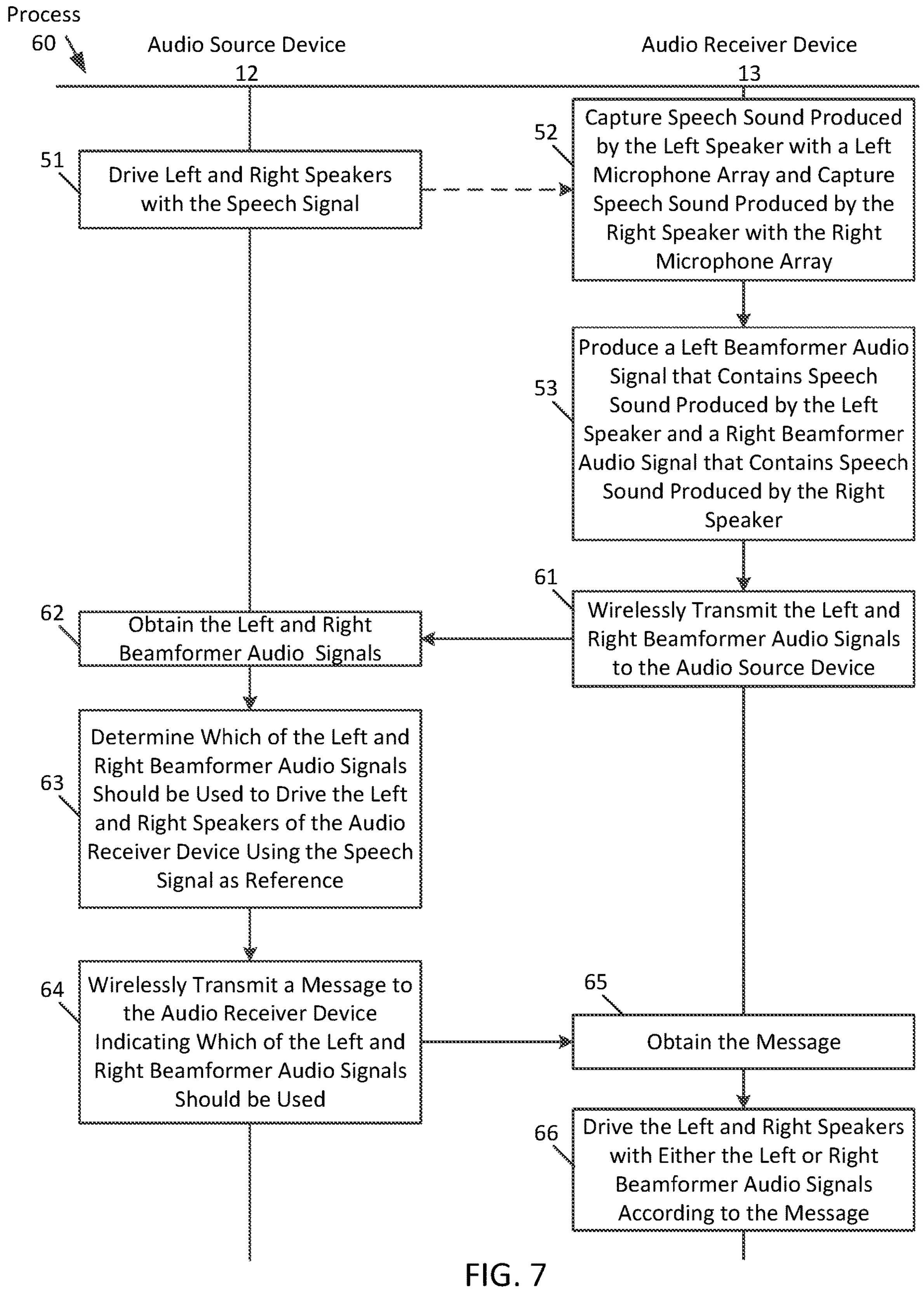
FIG. 7 is a flowchart of one aspect of a process for an audio source device to determine which of several output beamformer audio signals is to be used as a speech signal for output by the audio receiver device.

FIG. 7 is a flowchart of one aspect of a process 60 for an audio source device 12 to determine which of several output beamformer audio signals is to be used as a speech signal for output by the audio receiver device 13. Specifically, this figure illustrates a process 60 of how the controller 15 of the audio source device determines whether to instruct the audio receiver device 13 to drive speakers 51 and/or 52 with a beam pattern produced by either array 47 and 48.

Similar to process 50 of FIG. 6, this process 60 begins by driving the left speaker 43 and the right speaker 44 with the speech signal 27 (at block 51). The audio receiver device 13 captures speech sound produced by the speakers with the microphone arrays 45 and 46 (at block 52). The process 60 produces a left beamformer audio signal that contains speech sound produced by the left speaker 43 and a right beamformer audio signal that contains speech sound produced by the right speaker 44 (at block 53).

The process 60 deviates from the process 50 as follows. Specifically, the process 60 wirelessly transmits the left and right beamformer audio signals to the audio source device 12 (at block 61). In one aspect, the audio receiver device 13 may transmit each signal entirely, or may transmit portions of either signal. For instance, the audio receiver device 13 may transmit audio data associated with each signal (e.g., containing audio content of certain frequency components). The audio source device 12 obtains the left and right beamformer audio signals (at block 62). The source device 12 determines which of the beamformer audio signals should be used to drive the left and right speakers 51 and 52 of the audio receiver device 13, using the speech signal 27 as a reference (at block 63). In one aspect, the audio source device 12 may perform similar operations as described above to determine which beamformer signal (or portions of each beamformer signal) should be used. The audio source device transmits a message to the audio receiver device indicating which of the left and right beamformer audio signals should be used (at block 64). For instance, the message may indicate which beamformer signal (or portions of both beamformer signal) should be used to drive one or more of the audio receiver speakers. In another aspect, the message may indicate how the audio receiver device 13 is to process the beamformer audio signals according to the speech signal. For instance, the audio source device 12 may determine that there is a lot of noise in both beamformer audio signals. As a result, the message may indicate whether the audio receiver device may need to perform noise suppression operations.

The audio receiver device 13 obtains the message (at block 65). The audio receiver device drives the left speaker 51 and the right speaker 52 with either (or both) of the left and right beamformer audio signals according to the obtained message (at block 66).

Some aspects perform variations of the processes 50 and 60. For example, the specific operations of the processes may not be performed in the exact order shown and described. The specific operations may not be performed in one continuous series of operations and different specific operations may be performed in different aspects. For instance, although both processes 50 and 60 are illustrated as driving speakers 51 and 52 once a determination of which beamformer audio signal is to be used, this may not necessarily be the case. For instance, in order to prevent increased latency due to the wireless transmissions described in the processes (e.g., at blocks 54, 62, and 65), the audio receiver device 13 may drive speakers 51 and 52 with the respective beamformer audio signal, while a determination is made. Once it is determined that one beamformer audio signal is more preferable than the other, the audio receiver device 13 may perform an appropriate adjustment.

As described herein, in one aspect the audio receiver device may include one left microphone and one right microphone, rather than having respective microphone arrays. In this case, rather than determine which beamformer audio signal should be used (at block 56 and/or at block 63), the processes may determine which microphone signal produced by either one of the left microphone, the right microphone, or a combination is to be used to drive one or more speakers of the audio receiver device.

Figure 8:
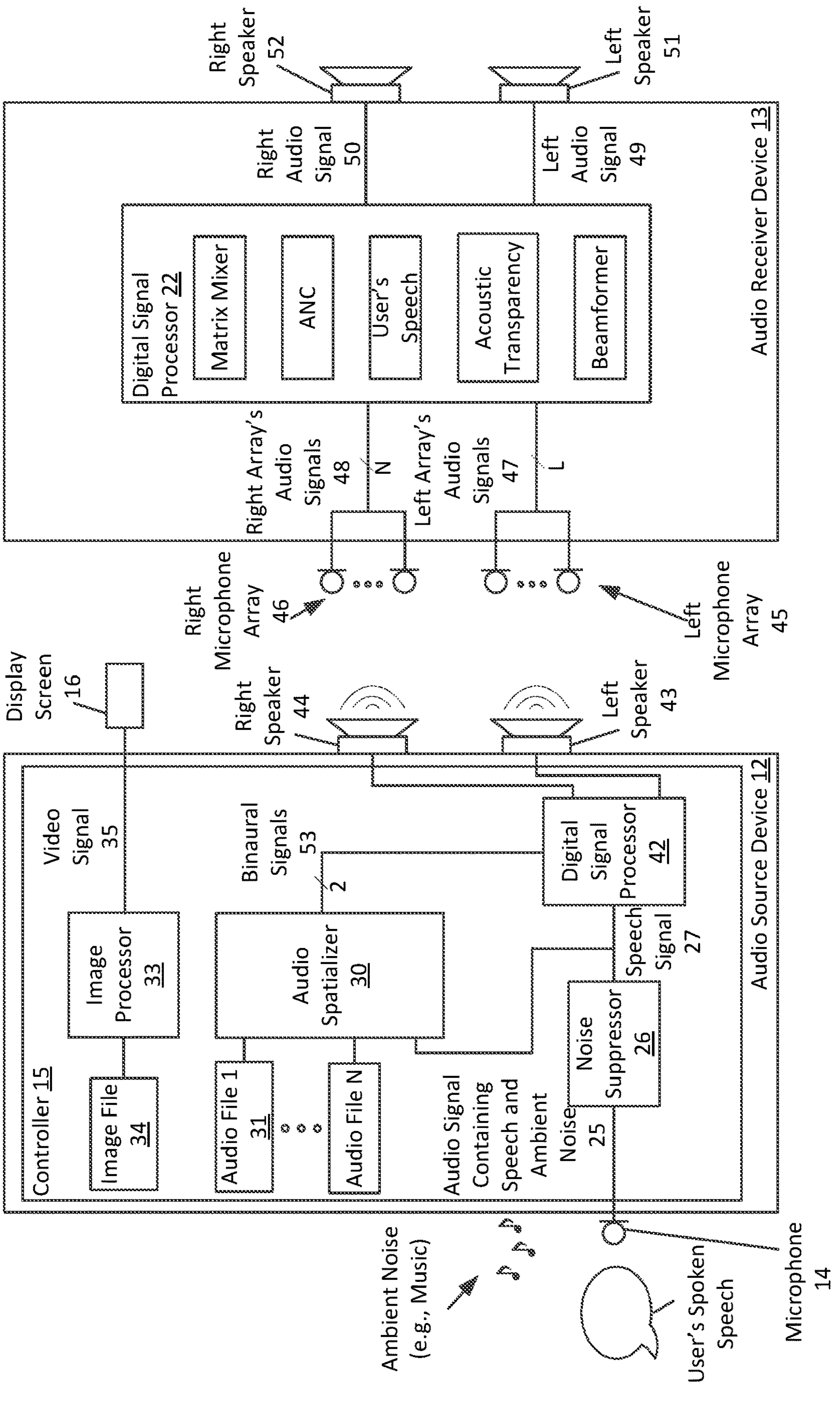
FIG. 8 shows a block diagram illustrating a computer system for reinforcing a user's own voice during an CGR session of another aspect of the disclosure.

FIG. 8 shows a block diagram illustrating a computer system for reinforcing a user's own voice during an CGR session of another aspect of the disclosure. Specifically, this figure illustrates that the binaural signals 53 are audibly transmitted to the audio receiver device 13, rather than being transmitted via a wireless communication link (e.g., via BLUETOOTH protocol). For instance, the digital signal processor 42 obtains the binaural signals 53 produced by the audio spatializer 30 and obtains the speech signal 27. The processor 42 processes the signals to produce a driver audio signal for both speakers 43 and 44. For instance, the processor 42 may mix a left binaural signal of the binaural signals 53 with the speech signal 27 to produce a left driver audio signal (or left mixed signal) for driving the left speaker 43, and may mix a right binaural signal of the binaural signals 53 with the speech signal 27 to produce a right driver audio signal (or right mixed signal) for driving the right speaker 44.

The audio receiver device 13 is configured to capture sound produced by both the left speaker 43 and the right speaker 44, as described herein. For instance, the left microphone array 45 may produce a directional beam pattern towards the left speaker 43 and the right microphone array 46 may produce a directional beam pattern towards the right speaker 44. The processor 22 of the audio receiver device 13 may output each directional beam pattern through a respective speaker of the device 13, as described herein.

In one aspect, the processor 22 may process each array's beamformer audio signal to determine how to drive the speakers 51 and 52. For instance, the processor 22 may extract speech content from the beamformer audio signal produced by the left array 45 and may extract speech content from the beamformer audio signal produced by the right array 46. As a result, each beamformer audio signal may be separated into a speech signal and a respective binaural signal of the binaural signals 53. These signals may, however, include some noise, due to the acoustic transmission. Thus, the processor may compare the speech signals extracted from each beamformer audio signal to determine which is more preferable for output. For example, the processor 22 may compare the extracted speech signals to determine which has more noise or is more attenuated. The processor 22 may select the extracted speech signal with less noise or is less attenuated. The processor 22 may mix the selected speech signal with each extracted binaural signal, and output both mixes into a respective speaker 51 and 52. In one aspect, the processor 22 may perform noise reduction operations on both extracted signals (speech signal and binaural signal), as described herein.

In another aspect, rather than the audio source device 12 acoustically transmit each binaural signal through a respective speaker, the audio source device 12 may downmix the binaural signals 53 into a downmixed signal (e.g., mono signal), and use the mono signal to drive one speaker (e.g., 43) and use the speech signal 27 (or processed speech signal) to drive the other speaker (e.g., 44). As a result, the directional beam pattern produced by the left array 45 would include the sound of the mono signal and the directional beam pattern produced by the right array 56 would include a reproduction of the speech. The processor 22 may upmix the sound of the mono signal into a left and right signal for mixing with speech and outputting through a respective speaker.

An aspect of the disclosure may be a non-transitory machine-readable medium (such as microelectronic memory) having stored thereon instructions, which program one or more data processing components (generically referred to here as a "processor") to perform the network operations, signal processing operations, and audio processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A head-mounted device (HMD) comprising:
- a microphone;
- an extra-aural speaker that is arranged to direct sound into an ambient environment in which the HMD is located;
- a processor; and
- memory having instructions stored therein which when executed by the processor causes the HMD while being worn by a user to:
  - capture in a microphone signal, using the microphone, user-desired audio content and ambient noise from within the ambient environment;
  - generate a user-desired audio signal from the microphone signal by reducing the ambient noise;
  - cause the extra-aural speaker to output the user-desired audio signal; and
  - transmit, over a wireless link, an audio signal that is different from the user-desired audio signal to a device that is being worn by the user.

2. The HMD of claim 1 further comprising a display, wherein the memory has further instructions to present a computer-generated reality (CGR) environment or a virtual object on the display, wherein the audio signal comprises a sound associated with the CGR environment or the virtual object.

3. The HMD of claim 2, wherein the CGR environment is a virtual environment in which the user is participating, wherein the memory has further instructions:

determine an amount of virtual reverberation associated with the virtual environment;

add the amount of virtual reverberation to the audio signal; and apply a spatial filter to the audio signal.

4. The HMD of claim 1, wherein the user-desired audio content comprises speech.

5. The HMD of claim 1 further comprising a plurality of extra-aural speakers to which the extra-aural speaker belongs, wherein the instructions to cause the extra-aural speaker to output the user-desired audio signal comprises instructions to produce a directional beam pattern that includes the user-desired audio content that is directed towards one or more microphones of the device.

6. The HMD of claim 1 further comprising a plurality of microphones of which the microphone belongs, wherein the instructions to capture comprises instructions to produce, using the plurality of microphones, a directional beam pattern that includes the user-desired audio content and the ambient noise as an output beamformer signal, wherein the user-desired audio signal is generated from the output beamformer signal.

7. The HMD of claim 1, wherein the device is either a pair of headphones, a wireless earphone, or a wireless earbud.

8. A method performed by a processor of a computer system comprising an audio source device and a wireless audio receiver device, both of which are to be worn by a user, the method comprising:

capturing in a microphone signal, using a microphone, user-desired audio content and ambient noise from within an ambient environment in which the user is located;

generating a user-desired audio signal from the microphone signal by reducing the ambient noise;

causing an extra-aural speaker of the audio source device to output the user-desired audio signal; and transmitting, over a wireless link, an audio signal that is different from the user-desired audio signal to the wireless audio receiver device.

9. The method of claim 8, wherein the audio signal comprises a sound associated with a computer-generated reality (CGR) environment or a virtual object within the CGR environment.

10. The method of claim 9 further comprising displaying the CGR environment or the virtual object on a display of the audio source device.

11. The method of claim 10, wherein the CGR environment is a virtual environment in which the user is participating, wherein the method further comprises:

determining an amount of virtual reverberation associated with the virtual environment;

adding the amount of virtual reverberation to the audio signal; and applying a spatial filter to the audio signal.

12. The method of claim 8, wherein causing the extra-aural speaker to output the user-desired audio signal comprises producing, using a plurality of extra-aural speakers to which the extra-aural speaker belongs, a directional beam pattern that includes the user-desired audio content that is directed towards one or more microphones of the device.

13. The method of claim 8, wherein capturing comprises producing, using a plurality of microphones to which the microphone belongs, a directional beam pattern that includes the user-desired audio content and the ambient noise as an output beamformer signal, wherein the user-desired audio signal is generated from the output beamformer signal.

14. The method of claim 8, wherein the user-desired audio content comprises speech.

15. A first wireless electronic device comprising:

a plurality of microphones;

a speaker;

a processor; and memory having instructions stored therein which when executed by the first wireless electronic device while being worn by a user to:

produce, using the plurality of microphones, a directional beam pattern directed towards an extra-aural speaker of a second wireless electronic device that is being worn by the user, the directional beam pattern capturing a sound produced by the extra-aural speaker as an output beamformer signal; and using the output beamformer signal to drive the speaker.

16. The first wireless electronic device of claim 15, wherein the memory has further instructions to activate an active noise cancellation (ANC) function to cause the speaker to produce anti-noise and the output beamformer signal.

17. The first wireless electronic device of claim 15, wherein the memory has further instructions to:

receive, over a wireless link, an audio signal from the second wireless electronic device; and use the audio signal to drive the speaker.

18. The first wireless electronic device of claim 17, wherein the audio signal is a spatially rendered audio signal associated with a computer-generated reality (CGR) setting that is to be presented on a display of the second wireless electronic device.

19. The first wireless electronic device of claim 15, wherein the first wireless electronic device is a wireless earbud.

20. The first wireless electronic device of claim 15, wherein the second wireless electronic device is a head-mounted device (HMD).

* * * * *